United States Patent
You et al.

(10) Patent No.: US 9,889,848 B2
(45) Date of Patent: Feb. 13, 2018

(54) APPARATUS AND METHOD FOR CONTROLLING LANE KEEPING OF VEHICLE

(71) Applicant: HYUNDAI MOBIS CO., LTD., Seoul (KR)

(72) Inventors: Eun Young You, Yongin-si (KR); Tae Hun Hwang, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 153 days.

(21) Appl. No.: 14/132,101

(22) Filed: Dec. 18, 2013

(65) Prior Publication Data

US 2015/0149036 A1  May 28, 2015

(30) Foreign Application Priority Data

Nov. 26, 2013  (KR) .......................... 10-2013-0144473

(51) Int. Cl.
 *A01B 69/00* (2006.01)
 *B60W 30/12* (2006.01)

(52) U.S. Cl.
 CPC ......... *B60W 30/12* (2013.01); *B60W 2420/42* (2013.01); *B60W 2710/202* (2013.01); *B60W 2710/207* (2013.01); *B60W 2720/14* (2013.01)

(58) Field of Classification Search
 CPC ............. B60W 30/12; B60W 2420/42; B60W 2710/202; B60W 2710/207; B60W 2720/17
 USPC .......................................................... 701/41
 See application file for complete search history.

(56) References Cited

U.S. PATENT DOCUMENTS

| | | | |
|---|---|---|---|
| 8,520,695 B1* | 8/2013 | Rubin ..................... | G08G 9/02 370/337 |
| 2005/0027402 A1* | 2/2005 | Koibuchi et al. ................. | 701/1 |
| 2005/0267661 A1* | 12/2005 | Iwazaki et al. ................. | 701/41 |
| 2005/0273262 A1* | 12/2005 | Kawakami et al. .......... | 701/301 |
| 2006/0030987 A1* | 2/2006 | Akita .............................. | 701/41 |
| 2009/0024279 A1* | 1/2009 | Takeda et al. ................. | 701/41 |
| 2010/0238283 A1* | 9/2010 | Kim ...................... | G06T 7/0042 348/135 |
| 2010/0246889 A1* | 9/2010 | Nara et al. .................... | 382/104 |
| 2010/0253598 A1* | 10/2010 | Szczerba et al. ................. | 345/7 |

(Continued)

FOREIGN PATENT DOCUMENTS

| | | |
|---|---|---|
| CN | 1707547 A | 12/2005 |
| CN | 101837780 A | 9/2010 |

(Continued)

OTHER PUBLICATIONS

Korean Office Action dated Nov. 20, 2014 in counterpart Korean Application No. KR 10-2013-0144473 (5 pages, in Korean).

Extended European Search Report mailed by the European Patent Office dated Apr. 25, 2014 in Corresponding European Patent Application No. 14150241.9 (8 pages in English).

(Continued)

*Primary Examiner* — Behrang Badii
*Assistant Examiner* — Daniel L Greene
(74) *Attorney, Agent, or Firm* — NSIP Law

(57) ABSTRACT

A lane keeping assistance system (LKAS) is a system that detects a lane through a sensor and prevents a vehicle from deviating from the lane by changing positional information of the detected lane to a torque value. Disclosed are an apparatus and a method for controlling lane keeping of a vehicle that start or cancel a lane keeping function based on driving state of the vehicle.

21 Claims, 4 Drawing Sheets

(56) References Cited

U.S. PATENT DOCUMENTS

| | | | |
|---|---|---|---|
| 2010/0295668 A1* | 11/2010 | Kataoka | B62D 15/025 340/435 |
| 2011/0196579 A1* | 8/2011 | Tokimasa et al. | 701/48 |
| 2011/0231062 A1 | 9/2011 | Kim | |
| 2013/0027195 A1* | 1/2013 | Van Wiemeersch | B60W 30/12 340/431 |
| 2013/0030602 A1 | 1/2013 | Joeng | |
| 2013/0278440 A1* | 10/2013 | Rubin | G08G 9/02 340/903 |
| 2014/0180543 A1* | 6/2014 | Ueda et al. | 701/41 |
| 2014/0306844 A1* | 10/2014 | Kim | G01S 13/867 342/385 |

FOREIGN PATENT DOCUMENTS

| | | |
|---|---|---|
| CN | 102189993 A | 9/2011 |
| CN | 102951151 A | 3/2013 |
| JP | 2005-306283 A | 11/2005 |
| KR | 10-2011-0126820 A | 11/2011 |
| KR | 10-2012-0136492 A | 12/2012 |
| KR | 10-2013-0013485 A | 2/2013 |
| KR | 10-2013-0016721 A | 2/2013 |
| KR | 10-2013-0021999 A | 3/2013 |
| KR | 10-2013-0051375 A | 5/2013 |

OTHER PUBLICATIONS

Chinese Office Action dated Aug. 2, 2016, in counterpart Chinese Application No. 201410144167.5. (9 pages in Chinese).

\* cited by examiner

[FIG. 1]
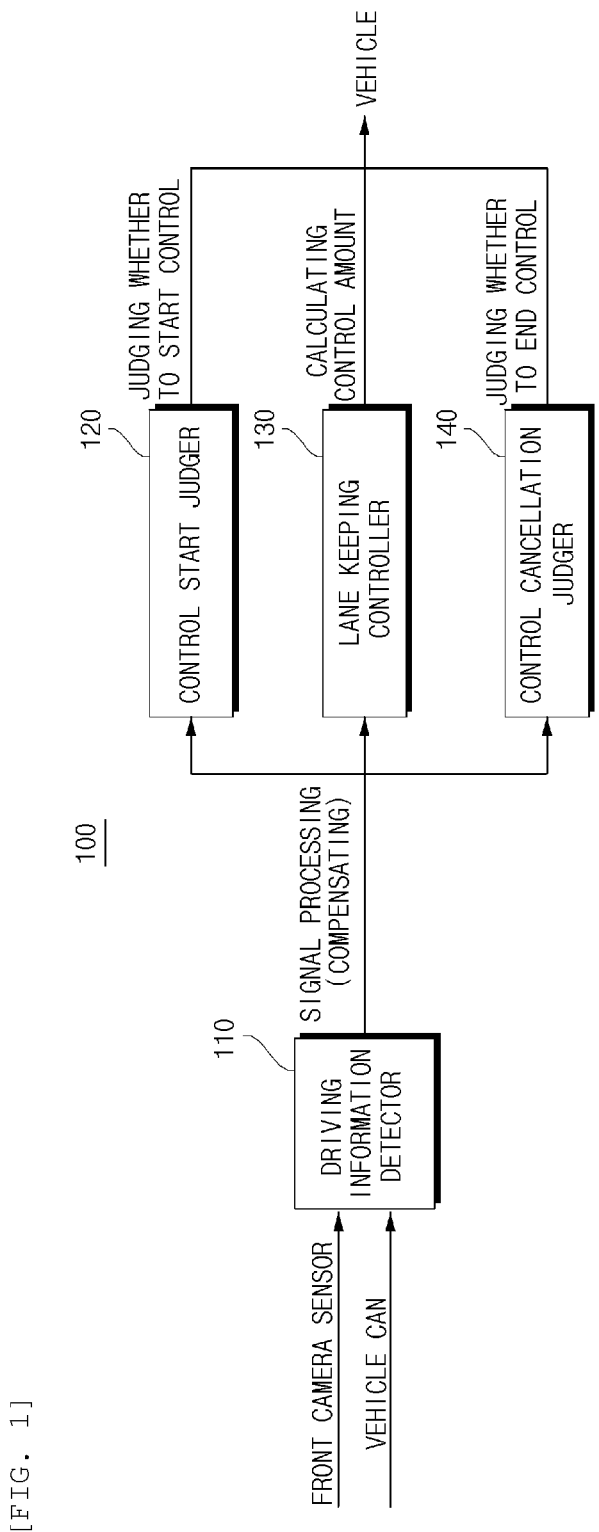

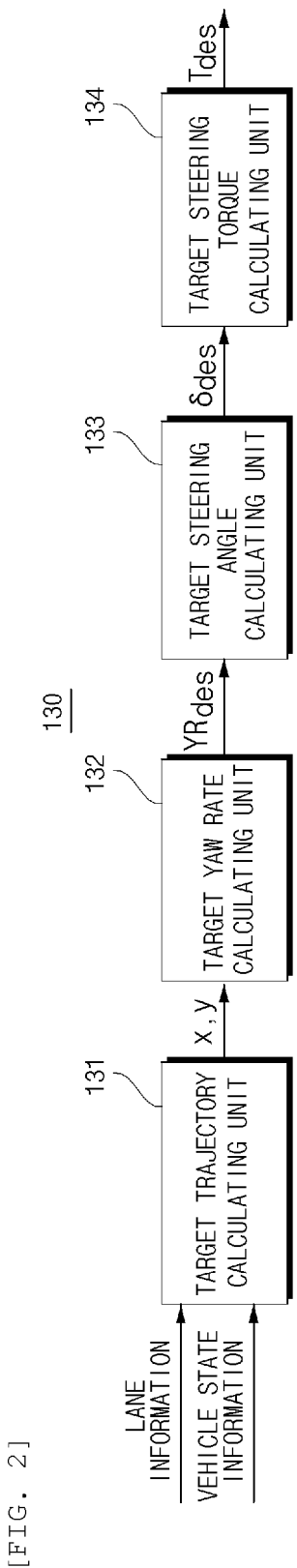
[FIG. 2]

[FIG. 3]
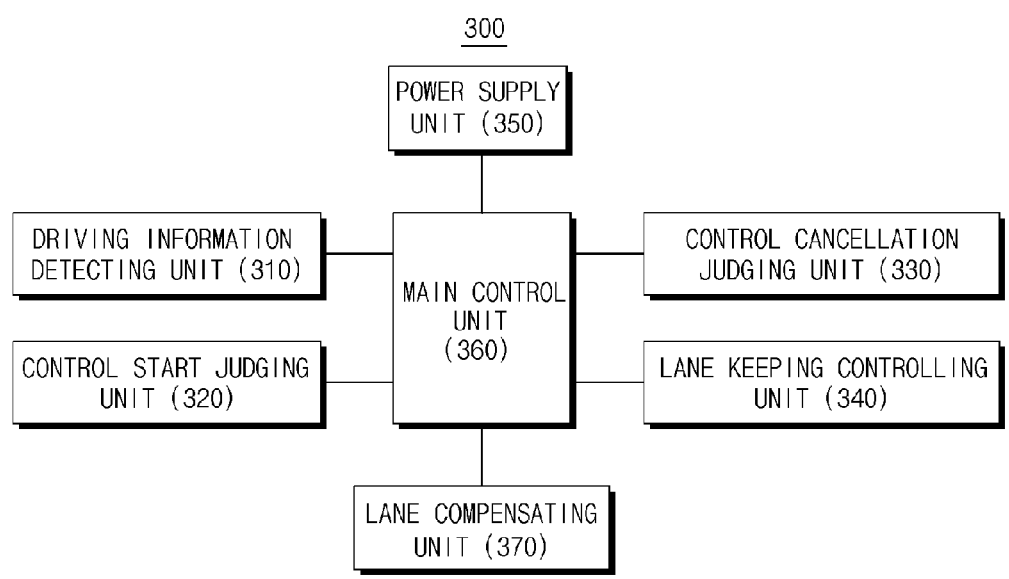

[FIG. 4]
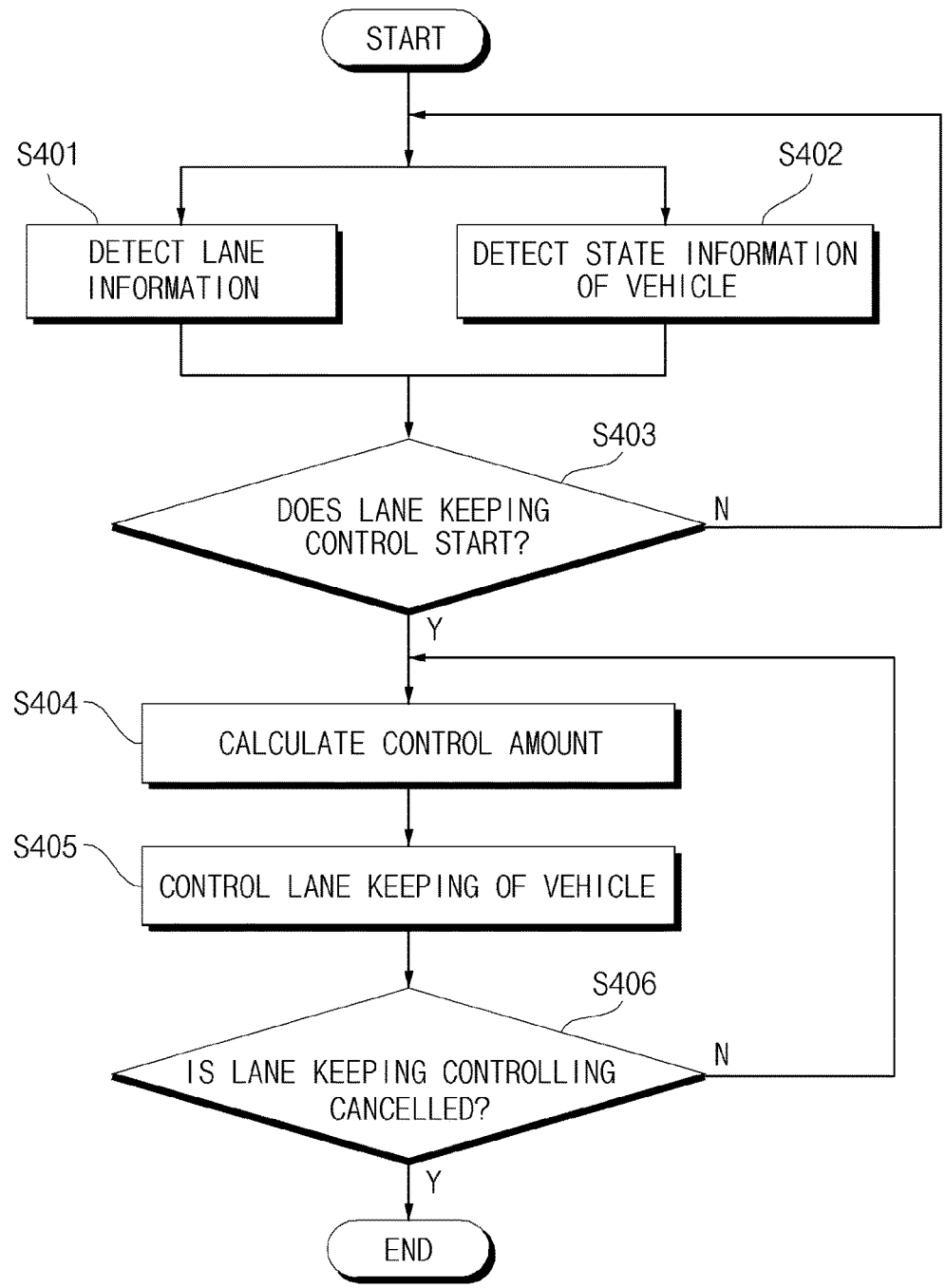

APPARATUS AND METHOD FOR CONTROLLING LANE KEEPING OF VEHICLE

CROSS-REFERENCE TO RELATED APPLICATIONS

This application claims priority to and the benefit of Korean Patent Application No. 10-2013-0144473 filed in the Korean Intellectual Property Office on Nov. 26, 2013, the entire contents of which are incorporated herein by reference.

TECHNICAL FIELD

The present invention relates to an apparatus and a method for controlling driving of a vehicle. More particularly, the present invention relates to an apparatus and a method for automatically controlling driving of a vehicle to enable lane keeping.

BACKGROUND

A lane keeping assistance system (LKAS) is a system that detects a lane through a sensor and prevents a vehicle from deviating from the lane by changing positional information of the detected lane to a torque value.

The LKAS is significantly influenced by accuracy of a camera when assisting the vehicle not to deviate from the lane by using road information measured through the camera.

A case frequently occurs, in which the camera un recognizes or misrecognizes the lane due to environmental factors such as a guardrail, a brake impression, a dual lane, snow, rain, and the like while driving on the road, and when the LKAS control malfunctions due to unrecognition and misrecognition of the lane, a driver may feel a sense of difference and a dangerous situation may be caused.

Further, the LKAS in related art has also a problem in that it is impossible to autonomously start actuating or cancel the LKAS by sensing whether the driver is drowsy.

Korean Patent Application Laid-Open No. 2011-0126820 discloses a lane recognizing apparatus. However, since the apparatus predicts the lane based on lane information having high reliability by using reliability of a camera signal, there is no solution for a case in which the lane information is misrecognized, and it is also impossible that the apparatus starts to be autonomously actuated or is cancelled. Therefore, the apparatus cannot solve the aforementioned problem.

SUMMARY

The present invention has been made in an effort to provide an apparatus and a method for controlling lane keeping of a vehicle that starts or cancels a lane keeping function based on a driving state of the vehicle.

An exemplary embodiment of the present invention provides an apparatus for controlling lane keeping of a vehicle, including: a driving information detecting unit configured to detect lane information on a road and state information of the vehicle, which is driven on the road, every predetermined time; a control start judging unit configured to judge whether to start lane keeping control of the vehicle by using the detected lane information and state information; a control cancellation judging unit configured to judge whether to cancel the lane keeping control by using the lane information and the state information detected after the lane keeping control starts; and lane keeping controlling unit configured to calculate a control amount for controlling the vehicle based on the lane information and the state information detected every predetermined time before the lane keeping control is cancelled after the lane keeping control starts, and allow the vehicle to keep the lane on the road based on the control amount.

The control start judging unit may judge that the lane keeping control is to be started when it is judged that the vehicle deviates from the lane.

The control start judging unit may judge that the vehicle deviates from the lane when an offset between the vehicle and the lane at each side is equal to or less than a first reference value.

The control start judging unit may decide the first reference value based on a lane width of the road where the vehicle is driven.

The control cancellation judging unit may judge that the lane keeping control is to be canceled when it is judged that the vehicle does not deviate from the lane, the steering angle is input by the driver, or at least one of the lane information and the state information is not detected.

The control cancellation judging unit may judge that the vehicle does not deviate from the lane when the offset between the vehicle and the lane at each side is equal to or less than a second reference value.

The control cancellation judging unit may decide the second reference value based on the lane width of the road where the vehicle is driven and a weighted value.

The lane keeping controlling unit may generate a target trajectory based on a speed of the vehicle and calculate a yaw rate and a steering angle for following the target trajectory with the control amount to allow the vehicle to keep the lane.

The apparatus may further include a lane compensating unit configured to compensate for a misrecognized/unrecognized lane when at least one of both lanes on the road where the vehicle is driven is misrecognized/unrecognized.

The lane compensating unit may judge whether a lane included in an image acquired by photographing the lane is a misrecognized/unrecognized lane by using sensing information acquired by sensing the lane and compensates for the misrecognized/unrecognized lane by using the sensing information when it is judged that the lane included in the image is the misrecognized/unrecognized lane.

The lane compensating unit may use the offset between the vehicle and the lane at each side, a heading angle of the vehicle, and the curvature of the road where the vehicle is driven, as the sensing information.

An exemplary embodiment of the present invention provides a method for controlling lane keeping of a vehicle, including: detecting lane information on a road and state information of the vehicle, which is driven on the road, every predetermined time; judging whether to start lane keeping control of the vehicle by using the detected lane information and state information; judging whether to cancel the lane keeping control by using the lane information and the state information detected after the lane keeping control starts; and calculating a control amount for controlling the vehicle based on the lane information and the state information detected every predetermined time before the lane keeping control is cancelled after the lane keeping control starts, and allowing the vehicle to keep the lane on the road based on the control amount.

In the judging of whether to start the lane keeping control, it may be judged that the vehicle deviates from the lane when an offset between the vehicle and the lane at each side is equal to or less than a first reference value and it may be judged that the lane keeping control is to be started when it is judged that the vehicle deviates from the lane.

In the judging of whether to start the lane keeping control, the first reference value may be decided based on a lane width of the road where the vehicle is driven.

In the judging of whether to cancel the lane keeping control, it may be judged that the lane keeping control is to be canceled when it is judged that the vehicle does not deviate from the lane, a steering angle is input by the driver, or at least one of the lane information and the state information is not detected.

In the judging of whether to cancel the lane keeping control, it may be judged that the vehicle does not deviate from the lane when the offset between the vehicle and the lane at each side is equal to or more than a second reference value, and the second reference value may be decided based on the lane width of the road where the vehicle is driven and a weighted value.

In the allowing of the vehicle to keep the lane, a target trajectory may be generated based on a speed of the vehicle and a yaw rate and a steering angle for following the target trajectory are calculated with the control amount to allow the vehicle to keep the lane.

The method may further include compensating for a misrecognized/unrecognized lane when at least one of both lanes on the road where the vehicle is driven is misrecognized/unrecognized.

The present invention can obtain the following effects by starting or cancelling a lane keeping function based on a driving state of a vehicle.

First, lane keeping of the vehicle can be controlled even though a driver is in an abnormal state due to drowsiness or drinking.

Second, a steering difference can be reduced by variously classifying a case in which the lane keeping function is started or cancelled.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a conceptual diagram of a lane keeping assistance system according to an exemplary embodiment of the present invention.

FIG. 2 is a conceptual diagram for an internal constitution of a lane keeping controller constituting the lane keeping assistance system.

FIG. 3 is a block diagram schematically illustrating a lane keeping controlling apparatus according to an exemplary embodiment of the present invention.

FIG. 4 is a flowchart sequentially illustrating a lane keeping controlling method according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

FIG. 1 is a conceptual diagram of a lane keeping assistance system according to an exemplary embodiment of the present invention.

A lane keeping assistance system (LKAS) 100 represents a system that assists a driver to operate steering so as to prevent the vehicle from deviating from a lane while driving by using relative information between the vehicle and the lane acquired through a front camera sensor and vehicle state information acquired through vehicle CAN communication.

The LKAS 100 needs to be controlled so as to prevent the driver from feeling a steering difference when the vehicle deviates from a lane while driving or when a driver's steering will is sensed.

To this end, the LKAS 100 includes a driving information detector 110, a control start judger 120, a lane keeping controller 130, and a control cancellation judger 140.

First, respective components of FIG. 1 will be described below in brief.

The driving information detector 110 serves to acquire information between the vehicle and the lane through a camera sensor and a vehicle sensor.

The driving information detector 110 acquires relative information (an offset between a vehicle center and left and right lanes, a road curvature, a heading angle, and the like) between the vehicle and the lane through the camera sensor and acquires vehicle state information (a steering angle, a yaw rate, a driver steering torque, a vehicle speed, and the like) through a vehicle CAN.

Since accuracy of measured information directly influences performance of the LKAS 100, reliability of the lane in misrecognition and unrecognition sections of the lane is improved through lane compensation logic in order to improve reliability of the system 100.

The control start judger 120 serves to decide a time of controlling preventing the vehicle from deviating from the lane by using the information detected through the driving information detector 110.

The control start judger 120 decides a control start time by using a transverse offset between the vehicle and the lane as a block for deciding the control start time for preventing the vehicle from deviating from the lane by using the information measured by the driving information detector 110.

The lane keeping controller 130 serves to calculate a control amount required to prevent the vehicle from deviating from the lane by using the information detected through the driving information detector 110.

The lane keeping controller 130 is a block that generates an assistance steering torque value for preventing the vehicle from deviating from the lane by using the vehicle speed, the yaw rate, the steering angle, a relative distance from the lane, the curvature, and the like, which are measured by the driving information detector 110.

The control cancellation judger 140 serves to decide a time of ending the control for preventing the vehicle from deviating from the lane by using the information detected through the driving information detector 110.

The control cancellation judger 140 judges the control ending time by using the information measured by the driving information detector 110.

First, the control cancellation judger 140 cancels the control when it is judged that the vehicle does not deviate from the lane based on a measurement value for the lane while controlling the lane keeping.

Second, the lane keeping control is operated, but when the vehicle deviates from the lane, a large control input is required to keep the lane and the operation causes a driver to feel a sense of difference or uneasiness. In order to prevent the sense of difference or uneasiness, the control cancellation judger 140 cancels the control when the vehicle deviates from the lane by a specific value or more.

Third, a certain physical parameter of the vehicle for controlling the lane keeping is calculated by using the vehicle state information and the lane information, and when reliability of the value is not assured, an incorrect control amount is calculated and reliability of the controller is not assured. In order to prevent the problems, the control cancellation judger 140 cancels the control when reliability of lane information does not meet a predetermined criterion.

Fourth, the control cancellation judger 140 cancels the control when it is measured that a signal by which it is judged that the driver intends to change a lane is sent or a driving operation by which it is judged that the driver intends to change a lane is performed.

Next, the respective components of FIG. 1 will be described in detail.

(1) Driving Information Detector 110

The driving information detector 110 acquires the lane information (the offset between the vehicle center and the left and right lanes, the road curvature, the heading angle, and the like) and the vehicle state information (the steering angle, the yaw rate, the driver steering torque, the vehicle speed, and the like) through the sensor.

The information acquired through the sensor is significantly influenced by surrounding environments. The surrounding environments such as snow, rain, counterlight, a guardrail and a tunnel of the road, a branch/joint point, and the like influence the unrecognition/misrecognition of the lane and since the information directly influences the calculation of the control amount, the lane information needs to be compensated in order to improve the reliability of the lane.

The driving information detector 110 may judge whether the lane is misrecognized/unrecognized by using the lane offset, the lane curvature, a change rate of the heading angle, left/right comparison, a lane reliability value, and the like which are measured and improve the reliability of the lane by compensating for the lane in sections in which the lane is misrecognized and unrecognized.

Meanwhile, the driving information detector 110 may perform compensation for the lane misrecognition section through a change rate of information such as lane quality, the offset, the curvature, a heading value, and the like and the comparison of left and right values and prevent frequent cut-off of the control by performing compensation using a tendency in which a previous lane is changed when the unrecognition section is short.

A magnitude of the change rate of the lane offset may not be equal to or more than a predetermined value A and the compensation is performed when the lane offset change rate at the left or right side is equal to or more than the predetermined value A. When the offset change rate at one of the left and right sides is equal to or more than the predetermined value A, the offset is compensated by using the offset at the other side. For example, when the offset change rate at the left side is equal to or more than the predetermined value A, the compensation is performed by using the right offset.

$$\text{Left offset }(t)=\text{Left offset }(t-1)+\text{Right offset change rate}$$

When both the left and right change rates are equal to or more than the predetermined value A, the lane offset is compensated during a predetermined time by using a mean change rate B.

$$\text{Left/right offset }(t)=\text{Left/right offset }(t-1)+\text{Mean offset change rate }(B)$$

When the curvature values and the heading values at the left and right sides are different from each other, it is judged that the lane is misrecognized and the curvature value and the heading value are compensated with values in which the change rates of the left and right values are compensated with values equal to or less than predetermined values $C_c$ and $C_h$.

When the left and right values are different from each other, a value on an opposite lane is compensated with the values of which the change rates are equal to or less than the predetermined values $C_c$ and $C_h$. For example, when the left change rate is equal to or less than the predetermined value, the left value is substituted with the right value. When both the left and right values are equal to or less than the predetermined values $C_c$ and $C_h$, the left and right values are compensated by using the mean change rate value. When both the left and right values are equal to or more than the predetermined values $C_c$ and $C_h$, the left and right values are compensated during a predetermined time by using the mean change rate value.

The foregoing description is made based on a fact that the lane, the curvature, the heading value, and the like are not discontinuously changed and the predetermined values A, $C_c$, and $C_h$, which are values set based on lane information acquired through a test, are calculated by using data in a section having high lane quality and have different values depending on the speed. The change rate represents a difference between a present value and a previous sampling value and the mean change rate represents a value acquired by averaging the change rate during a predetermined time.

(2) Control Start Judger 120

The control start judger 120 decides a control start condition for preventing the vehicle from deviating form the lane by using the lane information and the vehicle state information output from the driving information detector 110.

The control start judger 120 decides the control start condition by using the offset between the vehicle center and the left and right lanes and a lane width. The control start judger 120 starts the control when a distance between a left wheel and the lane or a distance between a right wheel and the lane is equal to or less than a limit value E. In this case, the limit value E may vary depending on the lane width.

(3) Lane Keeping Controller 130

The lane keeping controller 130 calculates the control amount for controlling the lane keeping by using the lane information (the offset between the vehicle center and the left and right lanes, the road curvature, the heading angle, and the like) and the vehicle state information (the steering angle, the yaw rate, the driver steering torque, the vehicle speed, and the like) output from the driving information detector 110.

FIG. 2 illustrates an internal configuration of the lane keeping controller 130.

A target trajectory calculating unit 131 generates a target trajectory for following a virtual line generated in order to estimate a predetermined offset designated at the vehicle center by using a target distance which may vary depending on the vehicle speed. In this case, the target trajectory calculating unit 131 may generate the target trajectory as a coordinate (x, y).

A target yaw rate calculating unit 132 generates a target yaw rate $YR_{des}$ for following the target trajectory.

A target steering angle calculating unit 133 calculates a target steering angle $\delta_{des}$ based on a target yaw rate.

A target steering torque calculating unit 134 generates a target steering torque $T_{des}$ from the target steering angle through a FeedForward control or a FeedBack control.

(4) Control Cancellation Judger 140

The control cancellation judger 140 judges the lane keeping control (lane deviation prevention control) ending time by using the information measured by the driving information detector 110.

First, the control cancellation judger 140 cancels the control when it is judged that the vehicle does not deviate from the lane based on a measurement value for the lane during the lane keeping control.

The control cancellation judger 140 cancels the control when distances Dl and Dr between the left and right wheels and the lane are equal to or more than a limit value F. The limit value F may vary depending on the lane width. The limit value F is set to be larger than the limit value E. This is to prevent the control from being started immediately after the control is cancelled by the limit value F.

Second, when the lane keeping control is operated, but the vehicle deviates from the lane, a large control input is required to keep the lane and the operation causes a driver to feel a sense of difference or uneasiness. In order to prevent the sense of difference or uneasiness, the control cancellation judger 140 cancels the control when the vehicle deviates from the lane with a specific value or more.

Third, a certain physical parameter of the vehicle for controlling the lane keeping is calculated by using the vehicle state information and the lane information, and when reliability of the value is not assured, reliability of a control amount calculated by using the value is not also assured. In order to prevent the problems, the control cancellation judger 140 cancels the control when a reliability value of the lane information does not meet a predetermined criterion.

The control cancellation judger 140 judges that the reliability of the lane information is not assured when both the left and right lane qualities are less than the predetermined values, when the change rates of the offsets of both the lanes are equal to or more than the predetermined values, when the change rate of the lane curvature or the heading angle is equal to or more than a predetermined value, when the difference in change rate of the left and right lane curvatures or the heading angle is equal to or more than the predetermined value, and the like.

Fourth, the control cancellation judger 140 cancels the control when it is measured that a signal by which it is judged that the driver intends to change a lane is sent or a driving operation by which it is judged that the driver intends to change a lane is performed. The control cancellation judger 140 cancels the control when it is judged that the driver intends to change a lane.

The control cancellation judger 140 may cancel the control by judging that the driver expresses the lane change will when a vehicle turn signal (lane change signal) is input.

Further, the control cancellation judger 140 may cancel the control by judging that the driver's lane change will is sensed when the driver steering torque value is equal to or more than a limit value G. The limit value G may vary depending on a size and a direction of a road curvature radius.

Hereinabove, a concept of the present invention has been described with reference to FIGS. 1 and 2. Hereinafter, an exemplary embodiment of the present invention, which is derived from the aforementioned concept, will be described. FIG. 3 is a block diagram schematically illustrating a lane keeping controlling apparatus according to an exemplary embodiment of the present invention.

Referring to FIG. 3, a lane keeping controlling apparatus 300 of a vehicle includes a driving information detecting unit 310, a control start judging unit 320, a control cancellation judging unit 330, a lane keeping controlling unit 340, a power supply unit 350, and a main control unit 360.

The power supply unit 350 serves to supply power to the respective components constituting the lane keeping controlling apparatus 300. The main control unit 360 serves to control operations of all of the respective components constituting the lane keeping controlling apparatus 300. Since the lane keeping controlling apparatus 300 may be mounted on a main ECU in the vehicle in order to control driving of the vehicle, the power supply unit 350 and the main control unit 360 may not be provided in the exemplary embodiment.

The driving information detecting unit 310 serves to detect lane information on the road and state information of the vehicle, which is driven on the road, every predetermined time.

The control start judging unit 320 serves to judge whether to start lane keeping control of the vehicle by using the lane information and the state information detected by the driving information detecting unit 310.

The control start judging unit 320 judges that the lane keeping control is to be started when it is judged that the vehicle deviates from the lane. The control start judging unit 320 judges that the vehicle deviates from the lane when the offset between the vehicle and the lane at each side is equal to or less than a first reference value. The control start judging unit 320 may decide the first reference value based on a lane width of the road where the vehicle is driven.

The control cancellation judging unit 330 serves to judge whether to cancel the lane keeping control by using the lane information and the state information detected after the lane keeping control starts.

The control cancellation judging unit 330 judges that the lane keeping control is to be canceled when it is judged that the vehicle does not deviate from the lane, the steering angle is input by the driver, or at least one of the lane information and the state information is not detected.

The control cancellation judging unit 330 judges that the vehicle does not deviate from the lane when the offset between the vehicle and the lane at each side is equal to or more than a second reference value. The control cancellation judging unit 330 may decide the second reference value based on the lane width of the road where the vehicle is driven and a weighted value. In the exemplary embodiment, the second reference value is obtained by adding the weighted value having a plus value to the lane width, and as a result, the second reference value is larger than the first reference value.

The lane keeping controlling unit 340 serves to calculate a control amount for controlling the vehicle based on the lane information and the state information which are detected every predetermined time before the lane keeping control is cancelled after the lane keeping control starts, and allow the vehicle to keep the lane on the road based on the control amount.

The lane keeping controlling unit 340 generates a target trajectory based on the speed of the vehicle and calculates the yaw rate and the steering angle for following the target trajectory with the control amount to allow the vehicle to keep the lane.

The lane keeping controlling apparatus 300 may further include a lane compensating unit 370.

The lane compensating unit 370 serves to compensate for a misrecognized/unrecognized lane when at least one of both lanes on the road where the vehicle is driven is misrecognized/unrecognized.

The driving information detecting unit 310 detects sensing information acquired by sensing the lane and a lane image acquired by photographing the lane as the lane information. The lane compensating unit 370 compensates for the misrecognized/unrecognized lane by using the sensing information and the image detected by the driving information detecting unit 310.

In the exemplary embodiment, the lane compensating unit 370 may be constituted by a lane image acquiring unit, a sensing information calculating unit, a lane recognition determining unit, and a lane compensating unit.

The lane image acquiring unit serves to acquire the lane image by photographing the lane. The lane image acquiring unit uses a camera mounted on the vehicle in order to acquire the lane image.

The sensing information calculating unit serves to calculate the sensing information by sensing the lane. The sensing information calculating unit uses various sensors mounted on the vehicle in order to calculate the sensing information.

The sensing information calculating unit calculates at least one of the offset up to the lane at each side from the vehicle, the heading angle of the vehicle, and the curvature of the road where the vehicle is driven, as the sensing information.

The sensing information calculating unit predicts a present offset based on a previous offset acquired previously, a previous heading angle acquired previously, and a present speed of the vehicle, and calculates the present offset as the offset for the lane.

Further, the sensing information calculating unit predicts a present heading angle based on the previous heading angle acquired previously and a yaw rate change rate of the vehicle, and calculates the present heading angle as the heading angle of the vehicle.

The lane recognition determining unit serves to determine whether the lane, which is included in the lane image acquired by the lane image acquiring unit, is a normally recognized lane by using the sensing information calculated by the sensing information calculating unit.

The lane compensating unit serves to compensate for the lane included in the lane image by using the sensing information when the lane recognition determining unit determines that the lane included in the lane image is not a normally recognized lane.

When the offset for the lane is used as the sensing information, the lane recognition determining unit determines whether a difference value between a first offset change rate for the left lane and a second offset change rate for the right lane is equal to or more than a first threshold value.

When it is determined that the difference value is equal to or more than the first threshold value in the above, the lane compensating unit compensates for a lane having the lower offset change rate by comparing the first offset change rate and the second offset change rate.

When the heading angle is used as the sensing information, the lane recognition determining unit determines whether a heading angle for the left lane and a heading angle for the right lane are the same as each other. When it is determined that the heading angle for the left lane and the heading angle for the right lane are not the same as each other, the lane recognition determining unit determines whether the road curvature is less than a second threshold value.

When it is determined that the road curvature is less than the second threshold value, the lane compensating unit compensates for a lane having the smaller difference value by comparing a difference value between a change rate of the heading angle for the left lane and the present heading angle and a difference value between a change rate of the heading angle for the right lane and the present heading angle.

On the contrary, when it is determined that the road curvature is equal to or more than the second threshold value, the lane compensating unit compensates for the lane having the lower heading angle change rate by comparing the change rate of the heading angle for the left lane and the change rate of the heading angle for the right lane.

When the curvature for the lane is used as the sensing information, the lane recognition determining unit determines whether a curvature for the left lane and a curvature for the right lane are the same as each other.

When it is determined that the curvature for the left lane and the curvature for the right lane are not the same as each other, the lane compensating unit compensates for a lane having a lower curvature change rate by comparing the change rate of the curvature for the left lane and the change rate of the curvature for the right lane.

On the contrary, when it is determined that the curvature for the left lane and the curvature for the right lane are the same as each other, the lane recognition determining unit determines whether a difference value between a change rate of the offset for the left lane and a present offset or a difference value between a change rate for the offset for the right lane and the present offset is equal to or more than a third threshold value.

When it is determined that the difference value between a change rate of the offset for the left lane and the present offset or the difference value between the change rate for the offset for the right lane and the present offset is equal to or more than the third threshold value, the lane compensating unit compensates for a lane having a lower offset change rate by comparing the change rate of the offset for the left lane and the change rate of the offset for the right lane.

In the exemplary embodiment, the lane compensating unit 370 is configured to be separated from the driving information detecting unit 310, but may be provided in the driving information detecting unit 310.

Next, an operating method of the lane keeping controlling apparatus 300 illustrated in FIG. 3 will be described. FIG. 4 is a flowchart sequentially illustrating a lane keeping controlling method according to an exemplary embodiment of the present invention. The following description will be made with reference to FIGS. 3 and 4.

First, the driving information detecting unit 310 detects lane information on the road and state information of the vehicle, which is driven on the road, every predetermined time (S401 and S402).

Thereafter, the control start judging unit 320 judges whether to start lane keeping control of the vehicle by using the detected lane information and state information (S403).

The control start judging unit 320 judges that the vehicle deviates from the lane when the offset between the vehicle and the lane at each side is equal to or less than the first reference value and judges that the lane keeping control is to be started when it is judged that the vehicle deviates from the lane.

The control cancellation judging unit 330 judges whether to cancel the lane keeping control by using the lane information and the state information detected after the lane keeping control starts (S406).

The control cancellation judging unit 340 judges that the lane keeping control is to be canceled when it is judged that the vehicle does not deviate from the lane, the steering angle is input by the driver, or at least one of the lane information and the state information is not detected.

In addition, the lane keeping controlling unit 340 calculates a control amount for controlling the vehicle based on the lane information and the state information detected every predetermined time before the lane keeping control is cancelled after the lane keeping control starts (S404), and allows the vehicle to keep the lane on the road based on the control amount (S405).

Meanwhile, the lane compensating unit 370 may compensate for a misrecognized/unrecognized lane when at least one of both lanes on the road where the vehicle is driven is misrecognized/unrecognized before step S401.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for controlling lane keeping of a vehicle driving on a road, comprising:
    a driving information detecting unit configured to detect lane information of the road and state information of the vehicle, and to compensate for a misrecognized or unrecognized lane using a first side, in response to an offset change rate of a second side being greater than a reference value;
    a control start judging unit configured to determine whether to start lane keeping control of the vehicle based on the detected lane information and the state information;
    a control cancellation judging unit configured to determine whether to cancel the lane keeping control based on the lane information and the state information;
    a lane keeping controlling unit configured to calculate a control amount for controlling the vehicle based on the lane information and the state information and to allow the vehicle to keep on a lane on the road using the control amount; and
    a driving information detector configured to determine whether the lane is misrecognized or unrecognized using at least one of a lane curvature, a change rate of a head angle, or a lane reliability value.

2. The apparatus of claim 1, wherein the lane keeping controlling unit is further configured to generate a target trajectory based on a speed of the vehicle, and to calculate a yaw rate and a steering angle for following the target trajectory using the control amount to allow the vehicle to keep on the lane.

3. The apparatus of claim 1, wherein the lane compensating unit is further configured to determine whether a lane included in an image acquired by photographing the lane is a misrecognized or unrecognized lane based on the sensing information acquired by sensing the lane and compensates for the misrecognized or unrecognized lane based on the sensing information, in response to a determination that the lane included in the image is the misrecognized or unrecognized lane.

4. The apparatus of claim 1, wherein the control start judging unit is further configured to determine that the lane keeping control is to be started, in response to a determination that the vehicle deviates from the lane.

5. The apparatus of claim 4, wherein the control start judging unit is further configured to determine that the vehicle deviates from the lane, in response to the offset between the vehicle and the lane at each side of the vehicle being less than or equal to a first reference value.

6. The apparatus of claim 5, wherein the control start judging unit is further configured to determine the first reference value based on a lane width of the road where the vehicle is driven.

7. The apparatus of claim 1, wherein the control cancellation judging unit is further configured to determine that the lane keeping control is to be canceled, in response to a determination that the vehicle does not deviate from the lane, a determination that the steering angle is input by the driver, or one of the lane information or the state information not being detected.

8. The apparatus of claim 7, wherein the control cancellation judging unit is further configured to determine that the vehicle does not deviate from the lane, in response to the offset between the vehicle and the lane at each side of the vehicle being less than or equal to a second reference value.

9. The apparatus of claim 8, wherein the control cancellation judging unit is further configured to determine the second reference value based on the lane width of the road where the vehicle is driven and a weighted value.

10. The apparatus of claim 1, further comprising a lane compensating unit configured to compensate for the misrecognized or unrecognized lane based on any one or any combination of any two or more of sensing information comprising an offset between the vehicle and the lane at each side of the vehicle, a heading angle of the vehicle, and a curvature of the road, in response to one or both lanes on the road where the vehicle is driven being misrecognized or unrecognized,
   wherein the control cancellation judging unit is further configured to cancel the lane keeping control, in response to reliability of the lane information not meeting a criterion, and
   wherein the driving information detector is further configured to compensate using a mean change rate, in response to the offset change rate of the first side and the offset change rate of the second side both being greater than the value.

11. The method of claim 10, further wherein a heading angle is adjusted based on a compensation of change rates of left and right values, in response to the determining that the lane is misrecognized.

12. A method for controlling lane keeping of a vehicle on a road, comprising:
   detecting lane information, based on a recognized lane or the compensated lane, of the road and state information of the vehicle;
   determining whether to start lane keeping control of the vehicle based on the lane information and state information;
   judging whether to cancel the lane keeping control based on the lane information and the state information;
   calculating a control amount for controlling the vehicle based on the lane information and the state information, and allowing the vehicle to keep on the lane using the control amount; and
   determining that the lane is misrecognized, in response to a determination that a curvature value representing a curvature of the road on a left side of the vehicle is different from a curvature value representing a curvature of the road on a right side of the vehicle.

13. The method of claim 12, wherein a target trajectory is generated based on a speed of the vehicle, and a yaw rate and a steering angle for following the target trajectory are calculated with the control amount to allow the vehicle to keep on the lane.

14. The method of claim 12, further comprising determining that the vehicle deviates from the lane, in response to the offset between the vehicle and the lane at each side of the vehicle being equal to or less than a first reference value, and determining that the lane keeping control is to be started, in response to a determination that the vehicle deviates from the lane.

15. The method of claim 14, wherein the first reference value is determined based on a lane width of the road where the vehicle is driven.

16. The method of claim 12, further comprising determining that the lane keeping control is to be canceled, in response to a determination that the vehicle does not deviate from the lane, a determination that a steering angle is input by the driver, or one of the lane information and the state information not being detected.

17. The method of claim 16, further comprising determining that the vehicle does not deviate from the lane, in response to the offset between the vehicle and the lane at each side of the vehicle being greater than or equal to a second reference value, the second reference value being decided based on the lane width of the road where the vehicle is driven and a weighted value.

18. The method of claim 12, further comprising, in response to a left offset change rate being greater than or equal to a value, performing compensation for a misrecognized section of the lane according to:

the left offset $(t)$=the left offset $(t-1)$+a right offset change rate, wherein t is time, and
   wherein the left offset is a distance between the vehicle and a left side of the lane, and the right offset change rate is a rate at which a distance between the vehicle and a right side of the lane changes.

19. The method of claim 18, further comprising, in response to a left offset change rate and the right offset change rate being greater than or equal to the value, performing compensation using a mean change rate according to:

the left offset $(t)$=the left offset $(t-1)$+the mean offset change rate the right offset $(t)$=the right offset $(t-1)$+the mean offset change rate, wherein the left offset change rate is a rate at which the distance between the vehicle and the left side of the lane changes.

20. An apparatus for controlling lane keeping of a vehicle driving on a road, comprising:
   a driving information detecting unit configured to detect lane information of the road and state information of the vehicle;
   a control start judging unit configured to determine whether to start lane keeping control of the vehicle based on the detected lane information and the state information;
   a control cancellation judging unit configured to determine whether to cancel the lane keeping control based on the lane information and the state information;
   a lane keeping controlling unit configured to calculate a control amount for controlling the vehicle based on the lane information and the state information, and to allow the vehicle to keep on the lane using the control amount; and
   a driving information detector configured to determine whether the lane is misrecognized or unrecognized using at least one of a lane curvature, a change rate of a head angle, or a lane reliability value, wherein the control start judging unit is further configured to determine that the vehicle deviates from the lane, in response to the offset between the vehicle and the lane at each side of the vehicle being less than or equal to a first reference value based on the lane width of the road where the vehicle is driven, and wherein the control cancellation judging unit is further configured to determine that the vehicle does not deviate from the lane, in response to the offset between the vehicle and the lane at each side of the vehicle being less than or equal to a second reference value based on the lane width of the road where the vehicle is driven and a weighted value, the second reference value being larger than the first reference value.

21. The apparatus of claim 20, wherein the detected lane information comprises information compensating for an initially misrecognized or unrecognized lane, and wherein misrecognition or unrecognition of the misrecognized or unrecognized lane is based on an offset between the vehicle and the lane at each side of the vehicle.

\* \* \* \* \*